(12) United States Patent
Liu et al.

(10) Patent No.: US 10,460,063 B1
(45) Date of Patent: Oct. 29, 2019

(54) INTEGRATED CIRCUIT ROUTING BASED ON ENHANCED TOPOLOGY

(71) Applicant: Cadence Design Systems, Inc., San Jose, CA (US)

(72) Inventors: Wen-Hao Liu, Cedar Park, TX (US); Gracieli Posser, Austin, TX (US); Wing-Kai Chow, Austin, TX (US); Mehmet Can Yildiz, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 203 days.

(21) Appl. No.: 15/649,402

(22) Filed: Jul. 13, 2017

(51) Int. Cl.
*G06F 17/50* (2006.01)

(52) U.S. Cl.
CPC ...... *G06F 17/5077* (2013.01); *G06F 17/5081* (2013.01); *G06F 2217/06* (2013.01)

(58) Field of Classification Search
USPC ........................................................ 716/131
See application file for complete search history.

(56) References Cited

U.S. PATENT DOCUMENTS

| | | | |
|---|---|---|---|
| 2005/0138578 A1* | 6/2005 | Alpert ................. | G06F 17/505 716/114 |
| 2013/0275934 A1* | 10/2013 | Alpert ................. | G06F 17/5077 716/111 |

* cited by examiner

Primary Examiner — Eric D Lee
(74) Attorney, Agent, or Firm — Schwegman Lundberg & Woessner, P.A.

(57) ABSTRACT

Aspects of the present disclosure address improved systems and methods for routing based on enhanced routing topologies. Consistent with some embodiments, the method may include accessing a routing topology of an integrated circuit design and determining that a routing path of a net in the routing topology violates a routing constraint. In response to determining that the routing path violates the routing constraint, a routing guide is created to reroute the routing path. The routing path in the net is then rerouted using the routing guide, thereby producing an enhanced routing topology that reduces issues in detailed routing caused by the routing constraint violation.

19 Claims, 9 Drawing Sheets

INTEGRATED CIRCUIT ROUTING BASED ON ENHANCED TOPOLOGY

TECHNICAL FIELD

The present disclosure generally relates to the technical field of integrated circuit design. In particular, the present disclosure addresses systems and methods for routing integrated circuit designs based on enhanced routing topologies.

BACKGROUND

An integrated circuit (IC) comprises cells of similar and/or various sizes, and connections between or among the cells. A cell includes several pins interconnected by wires to pins of one or more other cells. A net includes a set of pins connected by wires in order to form connections between or among the pins. A set of nets, called a netlist, defines the connections of an IC. In other words, a netlist specifies a group of nets, which, in turn, specify the required interconnections between or among a set of pins.

Design engineers design IC's by transforming circuit descriptions of the IC's into geometric descriptions, called layouts. To create layouts, design engineers typically use electronic design automation (EDA) applications. These applications provide sets of computer-based tools for creating, editing, and analyzing IC design layouts.

EDA applications create layouts by using geometric shapes that represent different materials and devices on IC's. For instance, EDA tools commonly use rectilinear lines to represent the wire segments that interconnect the IC components. These tools also represent electronic and circuit IC components as geometric objects with varying shapes and sizes.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnects between or among the circuit components; and (5) verification, which checks the layout to ensure that it meets design and functional requirements.

Routing is a key operation in the physical design cycle. It is generally divided into two phases: global routing and detailed routing. For each net, global routing generates a routing topology that includes an approximate routing path for the interconnect lines that are to connect the pins of the net. After the routing topology has been created, detailed routing creates specific individual routes for each net.

Due to the large number of nets in the netlist, it typically takes a long time for conventional routers to finish the connection task. In addition, the connections may be too numerous and/or overcrowded, such that conventional routers fail to finish the routing, particularly generating interconnections, without violating one or more routing constraints (e.g., design-rule constraints and performance constraints).

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
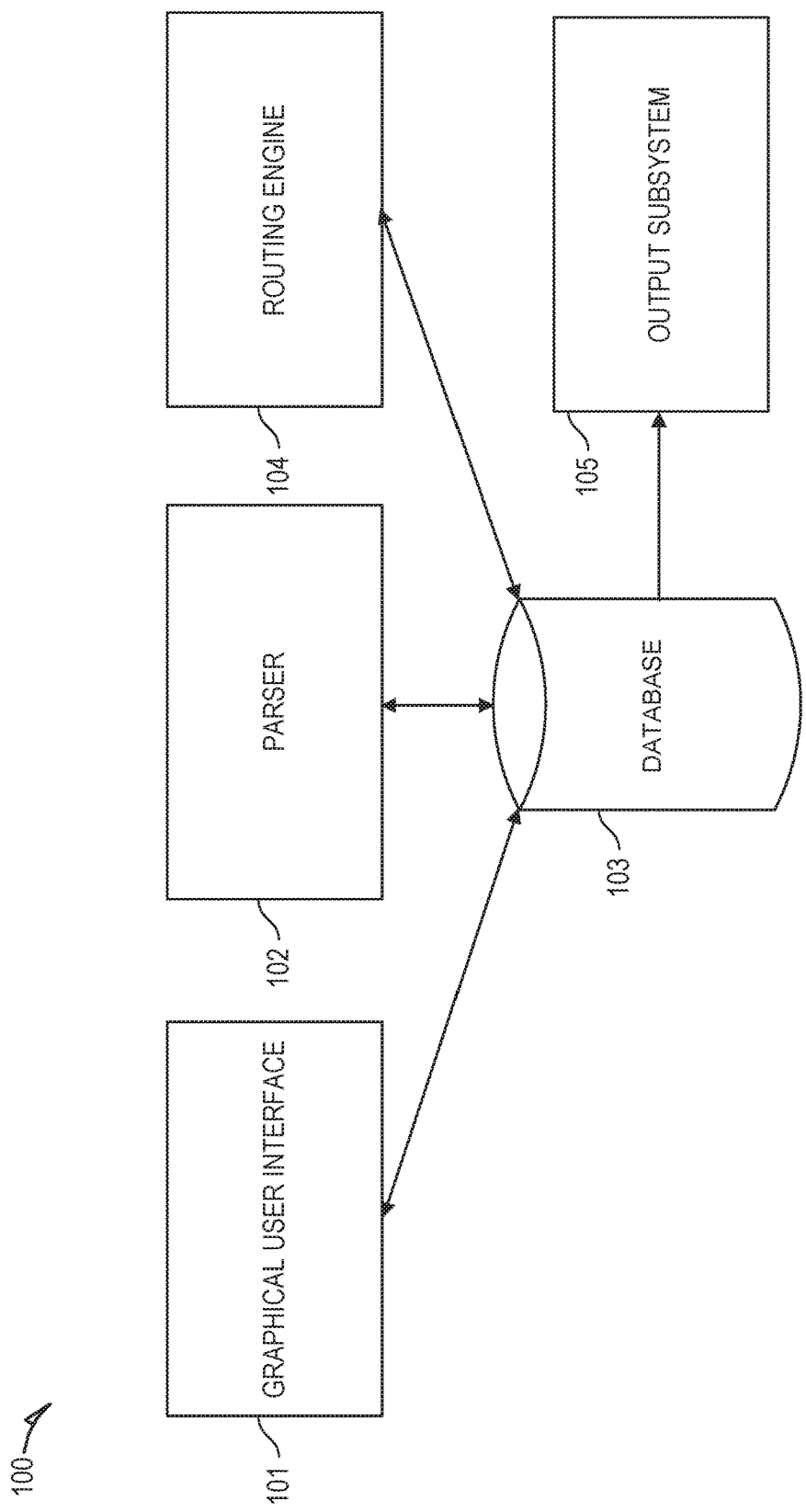
FIG. 1 is a block diagram illustrating a router system, according to some example embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As mentioned above, during global routing a global router generates approximate routing paths for interconnect lines that connect pins of a net at the beginning. These routing paths are typically specified in a routing topology, which is generated by the global router by determining an ideal routing path to connect the pins in the net. In general, routing topologies of timing-critical nets or clock nets should be well controlled in order to meet performance constraints such as timing, skew, and slew. However, the ideal routing of a net determined by the global router may be lost during detailed routing because the detailed router may change the ideal route to resolve design-rule constraints. For example, if the ideal route of a net crosses blockages or congestion areas, the detailed router will try to avoid the congestion or blockage, thereby deviating from the ideal route for the net determined by the global router, thus resulting in degradations to timing, skew, and slew for the net.

Aspects of the present disclosure address this problem, among others, with systems and methods for routing based on enhanced routing topologies. Enhanced routing topologies are created by refining routing topologies generated through traditional techniques using routing guides. Routing paths that cross routing blockages or congestion areas may be rerouted within the routing guides to avoid the routing blockages or congestion areas. The routing guides thereby offer an additional level of freedom for resolving design-rule constraints during detailed routing while also avoiding significant changes to the routing paths of the ideal routing topologies. In addition, the system may, in some embodiments, further refine routing topologies through use of a source-to-sink-aware bounding box expansion method that allows the source-to-sink length of a net to be kept during detailed routing so as to reduce or eliminate further degradation to the timing and slew of nets once routed.

A "routing blockage," as used herein, includes an object or region that, as defined by the IC design layout, wires are prohibited from traversing. Further, each region in the IC design has limited routing resources, meaning that the number of wires that may be routed within any particular region is limited. If the number of wires routed over a region is over the region's limit, that region is considered a "congestion area" for purposes of this disclosure.

With reference to FIG. 1, a router 100 is illustrated, according to some example embodiments. The router 100 comprises a graphical user interface (GUI) 101, a parser 102, a database 103, a routing engine 104, and an output subsystem 105. Any one or more of the functional components illustrated in FIG. 1 and described herein may be implemented using hardware (e.g., a processor of a machine) or a combination of hardware and software. For example, any one of the components described herein may configure a processor to perform the operations described herein for that component. Moreover, any two or more of these components may be combined into a single component, and the functions described herein for a single component may be subdivided among multiple components. Furthermore, according to various example embodiments, any of the functional components illustrated in FIG. 1 may be implemented together or separately within a single machine, database, or device or may be distributed across multiple machines, databases, or devices.

The GUI 101 is responsible for handling user interactions with the router 100. For example, the GUI 101 may allow a user to view wires generated by the router 100. The GUI 101 may also allow the user to view various information, such as routing tracks. The GUI 101 may also allow the user to interactively add and delete wires.

The parser 102 reads in IC design information stored in a format, such as an industry standard format and/or a custom format. The cells and connections are entirely or partly described in IC design information. Once some embodiments of the present disclosure finish routing, the generated wires will be output into the files as well. The database 103 stores the IC design information as well as wires in a compact and efficient manner. The database 103 may, for example, reside on a computer-readable storage device such as a computer memory or a hard drive. The routing engine 104 generates wires (which are then stored in the database 103) that interconnect the nets of an IC design in accordance with the netlist of the IC design. The output subsystem 105 outputs the wiring and other useful information into files of a standard and/or custom format.

Figure 2:
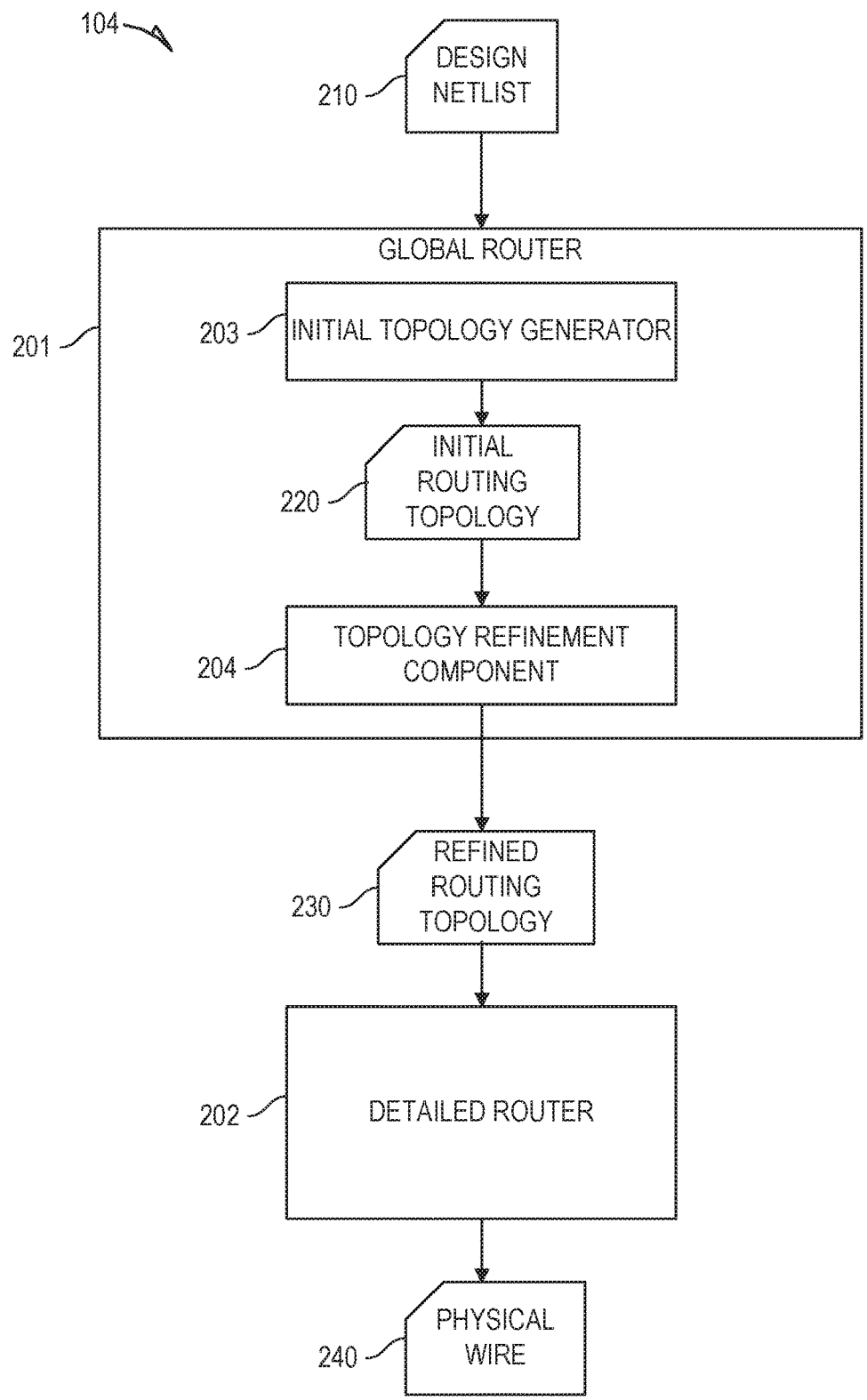
FIG. 2 is a block diagram illustrating functional components of a routing engine, which is provided as part of the router system, according to some example embodiments.

Referring now to FIG. 2, functional components of the routing engine 104 are illustrated, in accordance with some embodiments. To avoid obscuring the inventive subject matter with unnecessary detail, various functional components (e.g., modules, engines, and databases) that are not germane to conveying an understanding of the inventive subject matter have been omitted from FIG. 2. However, a skilled artisan will readily recognize that various additional functional components may be supported by the routing engine 104 to facilitate additional functionality that is not specifically described herein.

Further, any one or more of the functional components illustrated in FIG. 2 and described herein may be implemented using hardware (e.g., a processor of a machine) or a combination of hardware and software. For example, any one of the components described herein may configure a processor to perform the operations described herein for that component. Moreover, any two or more of these components may be combined into a single component, and the functions described herein for a single component may be subdivided among multiple components. Additionally, according to various example embodiments, any of the functional components illustrated in FIG. 2 may be implemented together or separately within a single machine, database, or device or may be distributed across multiple machines, databases, or devices.

As shown, the routing engine 104 comprises a global router 201 and a detailed router 202. The global router 201 is responsible for determining an approximate routing path for wires connecting each net in accordance with a design netlist 210 in a process referred to by those of ordinary skill in the art as "global routing." In doing so, the global router 201 may construct multiple levels, each with a global routing grid covering the entire IC design of one or more layers. At any one moment, only a portion, such as an area of one or more partitions, of the design may be routed; therefore much less memory and run time are required. In addition, since the routing task has been divided, multi-threaded parallelism can be applied to speed up the global router 201.

As shown, the global router 201 receives the design netlist 210 as input. An initial topology generator 203 of the global router 201 processes the design netlist 210 to generate an initial routing topology 220 that includes a routing path for each net in the IC design that connects the net's routable elements. Each routing path may include multiple connections, each of which represents a wire that connects two pins. The initial routing topology 220 includes a topological graph that represents the IC design layout topologically. The topological graph may include a tree structure that includes several topological items including nodes that represent the pins in each net as well as the connections between each pair of pins. The topological graph may further include a grid structure (also referred to as a "grid graph") superimposed over the tree structure. The grid structure comprises a plurality of perpendicular lines that form a plurality of grid cells.

Consistent with some embodiments, the global router 201 generates the initial routing topology 220, for example, based on a Steiner-tree approach. With the Steiner-tree approach, a minimum rectilinear Steiner tree (MRST) is used for routing a multi-pin net with minimum wire length. Given m points in the plane, an MRST connects all points by rectilinear lines, possibly via some extra points (called Steiner points), to achieve a minimum-wire-length tree of rectilinear edges. It shall be appreciated that the Steiner-tree approach is merely an example of the routing performed by the global router 201, and in other embodiments, the global router 201 may utilize one of several known global routing techniques. For example, in some embodiments, the global router 201 may generate the initial routing topology 220 based on a spine-tree approach. With the spine-tree approach, the global router 201 generates a connection network with a horizontal or vertical wire called a spine that spans all pins in the net either horizontally or vertically. Every pin is then connected to the spine directly with the shortest wire possible.

In the initial routing topology 220, the routing paths of timing-critical nets or clock nets need to be well controlled in order to meet timing, skew, or slew requirements. However, the initial ideal routing path of a net may be lost during detailed routing because the detailed router 202 may change the routing path to resolve design-rule constraints. For example, if the initial routing path of a net crosses blockages or congestion areas, the detailed router 202 will try to avoid the congestion or blockage, thereby deviating from the ideal routing path for the net included in the initial routing topology 220, thus resulting in degradations to timing, skew, and slew for the net.

To address this issue, the global router 201 includes a topology refinement component 204 that refines the initial routing topology 220 by creating routing guides based on the initial (ideal) routing topology 220. The topology refinement component 204 uses the routing guides to modify routing paths that cross blockages or congestion areas by rerouting the routing paths within the routing guides. The routing guides offer an additional level of freedom for resolving design-rule constraints during detailed routing while also avoiding significant changes to the routing paths of the initial routing topology 220. In addition, the topology refinement component 204 uses a source-to-sink-aware bounding box expansion method that allows the source-to-sink length of a net to be kept during detailed routing so as to reduce or eliminate further degradation to the timing and slew of nets once routed. The result of the refinements to the initial routing topology 220 performed by the topology refinement component 204 is a refined routing topology 230.

Figure 3A:
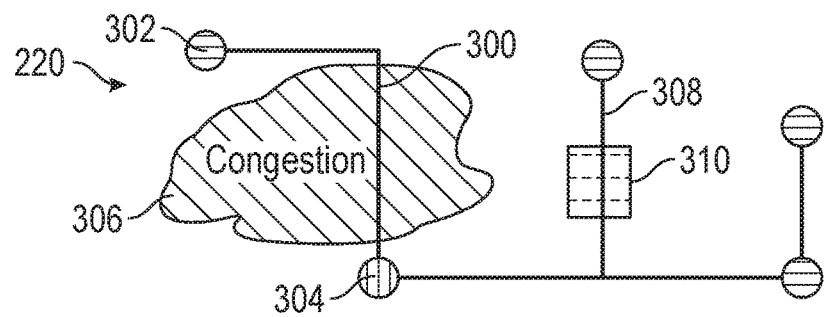
FIG. 3A-C are conceptual diagrams illustrating a high-level overview of a routing method performed by the routing engine, according to some example embodiments.
Figure 3B:
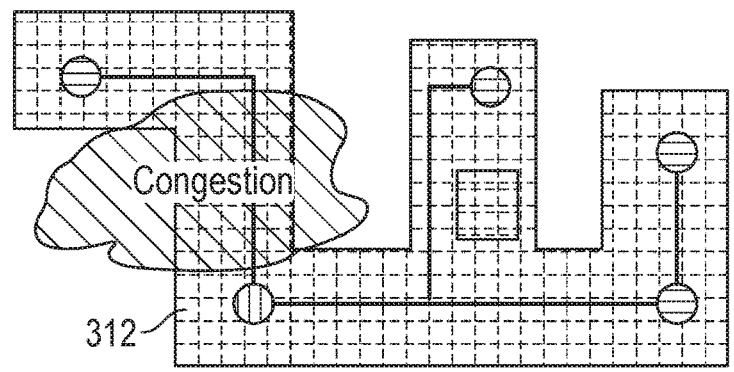
Figure 3C:
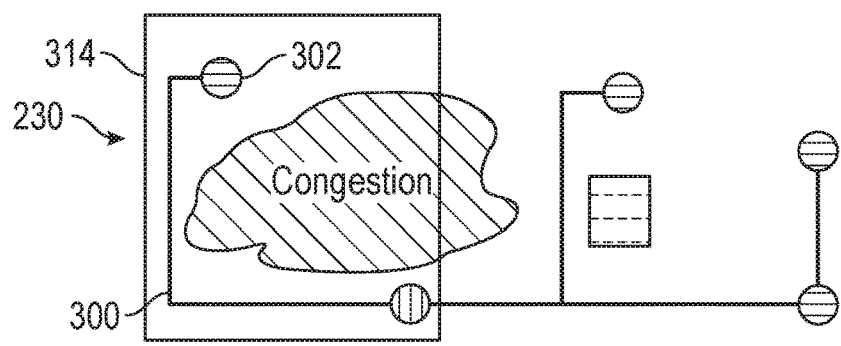

As an example, FIGS. 3A-C illustrate a high-level overview of a routing method employed by the routing engine 104 that uses a routing topology that is enhanced through refinement performed by the topology refinement component 204, according to a specific example. Initially, the topology refinement component 204 accesses the initial routing topology 220, which comprises a routing path that connects multiple pins. As shown in FIG. 3(A), in the initial routing topology 220, a connection 300 between pins 302 and 304 crosses congestion 306 and a connection 308 crosses blockage 310.

As shown in FIG. 3(B), the topology refinement component 204 generates a routing guide 312, which may be used to reroute the routing path to avoid the blockage 310 while avoiding significant changes to the route. Further, as shown in FIG. 3(C), the topology refinement component 204 utilizes a source-to-sink-aware bounding box 314 to reroute the connection 300 to avoid the congestion 306. The source-to-sink-aware bounding box 314 is the minimum bounding box for the connection 300 and the net source, pin 302. In this manner, the topology refinement component 204 enhances the initial routing topology 220 to produce the refined routing topology 230.

Returning to FIG. 2, the refined routing topology 230 is passed to the detailed router 202, which generates physical wires 240 that realize the refined routing topology 230. To generate the physical wires 240 that realize the refined routing topology 230, the detailed router 202 routes the complete design by dividing the entire design into a set of smaller areas and/or partitions. Consistent with some embodiments, the detailed router 202 can route these areas in parallel utilizing multi-threaded parallel computing capabilities. In other embodiments, the detailed routing can be single-threaded all or some of the time, and/or multi-threaded all or some of the time.

Figure 4:
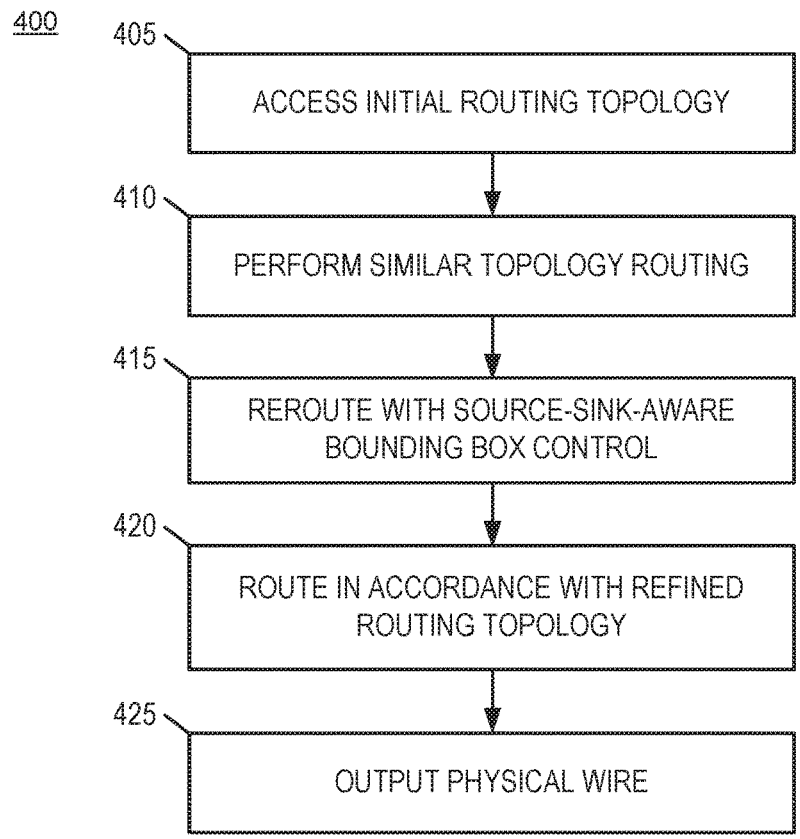
FIGS. 4-6 are flowcharts illustrating operations of the routing engine in performing a method for routing based on an enhanced topology, according to some example embodiments.
Figure 5:
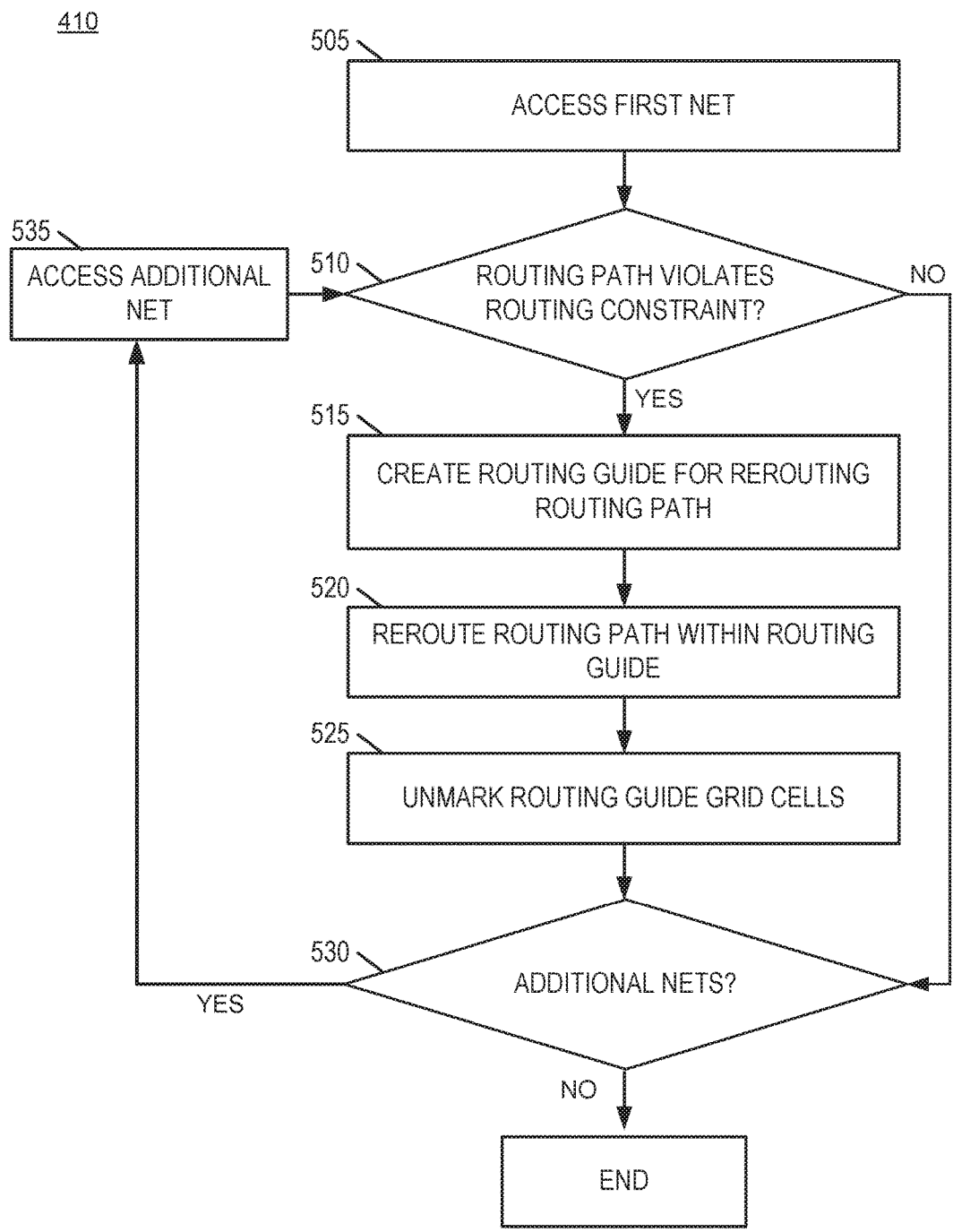
Figure 6:
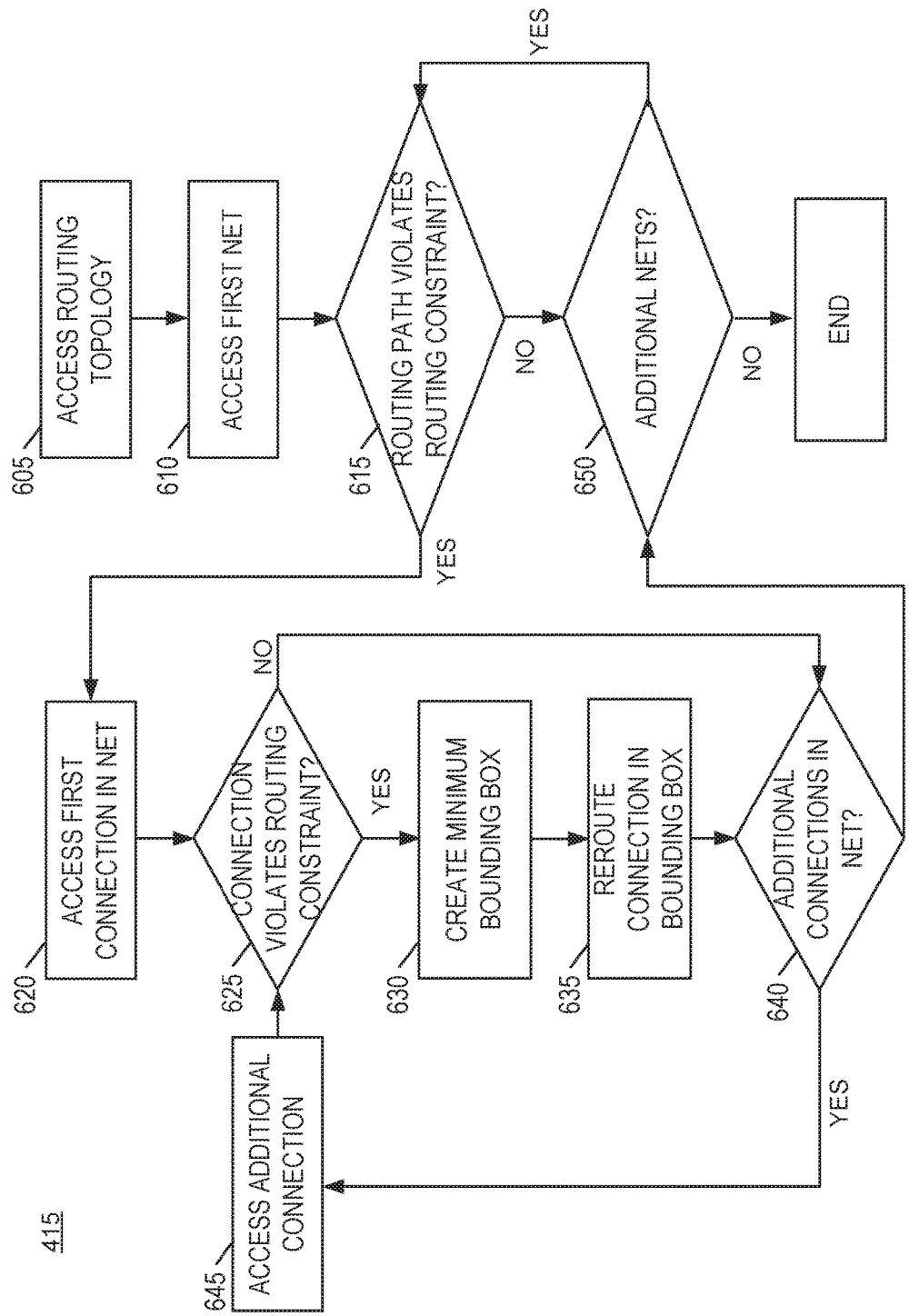

FIGS. 4-6 are flowcharts illustrating operations of the router 100 in performing a method 400 for routing based on an enhanced topology, according to some example embodiments. The method 400 may be embodied in computer-readable instructions for execution by one or more processors such that the operations of the method 400 may be performed in part or in whole by the routing engine 104; accordingly, the method 400 is described below by way of example with reference thereto. However, it shall be appreciated that at least some of the operations of the method 400 may be deployed on various other hardware configurations, and the method 400 is not intended to be limited to the routing engine 104.

At operation 405, the topology refinement component 204 accesses the initial routing topology 220 of an IC design. The initial routing topology 220 may be generated by the initial topology generator 203 of the global router 201 (e.g., based on the Steiner-tree approach). As noted above, the initial routing topology 220 comprises a routing path for each net in the IC design that connects the net's routable elements. The initial routing topology 220 includes a topological graph that includes a tree structure that represents each routing path and the pins in the net. The tree structure includes nodes that represent the pins in each net and connections between pairs of nodes that represent a wire that connects two nodes. The topological graph may further include a grid graph superimposed over the tree structure. The grid graph comprises a plurality of perpendicular lines that form a plurality of grid cells.

At operation 410, the topology refinement component 204 performs similar-topology routing based on the initial routing topology 220. In performing the similar-topology routing, the topology refinement component 204 creates routing guides for routing paths that violate routing constraints (e.g., by traversing routing blockages or congestion areas), and modifies these routing paths by rerouting them in accordance with the routing guides. The topology refinement component 204 creates the routing guides by marking grid cells in the grid graph that are within a predefined threshold distance of the routing path. The predefined threshold distance may, for example, be specified by a user via the GUI 101. Further details regarding the process of similar-topology routing performed by the topology refinement component 204 are discussed below in reference to FIG. 5. The result of performing the similar-topology routing is the refined routing topology 230, though it may be further refined through application of operation 415.

At operation 415, the topology refinement component 204 further refines the refined routing topology 230 by rerouting one or more connections using a source-to-sink-aware bounding box. The topology refinement component 204 reroutes specific connections that continue to violate routing constraints (e.g., by continuing to traverse routing congestion or blockage areas) despite the similar-topology routing performed at operation 410. For each connection being rerouted (e.g., each connection that traverses routing congestion or a blockage area), the topology refinement component 204 creates a minimum bounding box that encloses the connection and the net source, and reroutes the connection within the minimum bounding box while avoiding the routing congestion or blockage. The result of the rerouting performed at operation 415 is the refined routing topology 230.

At operation 420, the detailed router 202 routes the IC design in accordance with the refined routing topology 230. The detailed router 202 may utilize one of many commonly known graph-searching techniques used for routing, such as maze routing, shortest-path search, and A* search routing. In generating the physical wires 240, the detailed router 202 checks whether every wire obeys a set of fine-level routing rules. If a wire violates any such routing rules, the detailed router 202 will locally rip up and reroute the wires. The result of the routing of the IC design by the detailed router 202 is the physical wire 240 that realizes the refined routing topology 230. Because of the topology refinement steps of similar-topology routing (operation 410) and source-to-sink-aware bounding box rerouting (operation 415), the resulting physical wire 240 generated by the detailed router 202 avoids any routing blockage or congestion area that may be included in the IC design.

At operation 425, the router 100 outputs the physical wire 240. In outputting the physical wire 240, the output subsystem 105 may provide the physical wire 240 along with other useful information in files of a standard and/or custom format to another system or component of an EDA application. Further, as part of outputting the physical wire 240, the GUI 101 may present a graphical representation of the physical wire 240 on a display communicatively coupled to the router 100. Alternatively or in addition, the router 100 may store the physical wire 240 in a standard or custom file format within a data structure such as the database 103, which may reside on a computer-readable storage device (e.g., a hard drive).

As shown in FIG. 5, the operation 410 of the method 400, where the topology refinement component 204 performs similar-topology routing, may include operations 505, 510, 515, 520, 525, 530, and 535, consistent with some embodiments. At operation 505, the topology refinement component 204 accesses a first net in the initial routing topology 220. As used in this context, the term "first" is not intended to connote a particular order for processing nets from the initial routing topology 220; rather, in this context, the term "first" is used merely as a label for the initial net accessed by the topology refinement component 204 in an iterative process that involves processing each net included in the initial routing topology 220.

At operation 510, the topology refinement component 204 determines whether the routing path for the current net violates a routing constraint. In doing so, the topology refinement component 204 determines whether the current net traverses (e.g., crosses) a routing blockage or a congestion area. Initially, the first net accessed at operation 505 is the "current" net for purposes of operation 510; however, with subsequent iterations of the operations 510, 515, 520, 525, 530, and 535, the topology refinement component 204 iterates through and processes each net in the initial routing topology 220.

If, at operation 510, the topology refinement component 204 determines that the routing path for the current net violates a routing constraint, the topology refinement component 204, at operation 515, generates a routing guide for rerouting the routing path. The topology refinement component 204 may generate the routing guide by marking all grid cells in the grid graph that are within a predefined threshold distance of the routing path of the current net. The predefined threshold distance may, for example, be specified by a user via the GUI 101.

At operation 520, the topology refinement component 204 reroutes the routing path of the current net within the routing guide. The topology refinement component 204 reroutes the routing path within the routing guide (e.g., the marked grid cells) in a manner such that the routing path no longer violates the routing constraint (e.g., by rerouting to avoid blockage or congestion areas). For example, in rerouting the routing path, the topology refinement component 204 may apply one of many commonly known graph-searching based routing algorithms (e.g., maze routing, shortest-path search, and A* search routing) with a constraint that limits rerouting within the marked grid cells while forbidding the algorithm to search within the unmarked grid cells.

At operation 525, the topology refinement component 204 unmarks the marked grid cells. Upon the topology refinement component 204 unmarking the grid cells at operation 525, or if the topology refinement component 204 determines, at operation 510, that the routing path for the current net does not violate a routing constraint, the process proceeds to operation 530, where the topology refinement component 204 determines whether there are additional nets in the initial routing topology 220. If, at operation 530, the topology refinement component 204 determines that there are additional nets in the initial routing topology 220, the process proceeds to operation 535, where the topology refinement component 204 accesses an additional net in the initial routing topology 220 (e.g., a second net, third net, fourth net, etc.), and the process described above in reference to operations 510, 515, 520, and 525 is repeated for the additional net. In this manner, the topology refinement component 204 iterates through and reroutes each net in the initial routing topology 220 with a routing path that violates a routing constraint (e.g., by traversing a blockage or a congestion area).

If, at operation 530, the topology refinement component 204 determines that there are no additional nets in the initial routing topology 220, the process ends and the result is a refined routing topology (e.g., refined routing topology 230) that may be further refined at operation 420, further details of which are discussed below in reference to FIG. 6.

As shown in FIG. 6, the operation 415 of the method 400, where the topology refinement component 204 further refines the refined routing topology 230 by rerouting one or more connections of one or more nets in the refined routing topology 220, may include operations 605, 610, 615, 620, 625, 630, 635, 640, 645, and 650, according to some embodiments. However, in other embodiments, the operations 605, 610, 615, 620, 625, 630, 635, 640, 645, and 650 may be performed as part of a separate method that is distinct from the method 400 where the topology refinement component 204 performs the operations 605, 610, 615, 620, 625, 630, 635, 640, 645, and 650 with respect to the initial routing topology 220.

At operation 605, the topology refinement component 204 accesses a routing topology. Depending on the embodiments, the topology refinement component 204 may access either the initial routing topology 220 or the refined routing topology 230 generated as a result of operation 410.

At operation 610, the topology refinement component 204 accesses a first net in the routing topology. As used in this context, the term "first" is not intended to connote a particular order for processing nets from the routing topology; rather, in this context, the term "first" is used merely as a label for the initial net accessed by the topology refinement component 204 in an iterative process that involves processing each net included in the routing topology.

At operation 615, the topology refinement component 204 determines whether the routing path for the current net violates a routing constraint. In doing so, the topology refinement component 204 determines whether the current net traverses (e.g., crosses) a routing blockage or a congestion area. Initially, the first net accessed at operation 610 is the "current" net for purposes of operation 615; however, with subsequent iterations of the operations 615, 620, 625, 630, 635, 640, 645, and 650, the topology refinement component 204 iterates through and processes each net in the routing topology (e.g., 220 or 230).

If, at operation 615, the topology refinement component 204 determines that the routing path for the current net violates a routing constraint, the topology refinement component 204, at operation 620, accesses a first connection in the routing path. Again, as used in this context, the term "first" is not intended to connote a particular order for processing connections from the routing path; rather, in this context, the term "first" is used merely as a label for the initial connection accessed by the topology refinement component 204 in an iterative process that involves processing each connection included in the routing path.

At operation 625, the topology refinement component 204 determines whether the current connection in the routing path violates a routing constraint. In doing so, the topology refinement component 204 determines whether the current connection traverses (e.g., crosses) a routing blockage or a congestion area. Initially, the first connection accessed at operation 620 is the "current" connection for purposes of operation 625; however, with subsequent iterations of the operations 625, 630, 635, 640, and 645, the topology refinement component 204 iterates through and processes each connection of the routing path.

If, at operation 625, the topology refinement component 204 determines that the current connection violates a routing constraint, the topology refinement component 204, at operation 630, creates a minimum bounding box that encloses the connection and the source pin of the current net. In creating the minimum bounding box, the topology refinement component 204 computes the box with the smallest measure (e.g., in terms of area) within which the source pin and the entire connection line.

At operation 635, the topology refinement component 204 reroutes the connection within the minimum bounding box. In rerouting the connection, the topology refinement component 204 adjusts the routing of the connection such that the connection remains in the bounding box while avoiding routing blockages or routing congestions. For example, in rerouting the connection, the topology refinement component 204 may apply one of many commonly known graph-searching based routing algorithms (e.g., maze routing, shortest-path search, and A* search routing) with a constraint that limits rerouting within the minimum bounding box while forbidding the algorithm to search outside the minimum bounding box.

If, at operation 625, the topology refinement component 204 determines that the current connection does not violate a routing constraint, or upon rerouting the connection within the bounding box, the topology refinement component 204, at operation 640, determines whether there are any additional connections in the routing path of the current net.

If, at operation 640, the topology refinement component 204 determines that there are additional connections in the routing path of the current net, the topology refinement component 204, at operation 645, accesses an additional connection in the routing path (e.g., a second connection, third connection, fourth connection, etc.), and the process described above in reference to operations 625, 630, and 635 is repeated for the additional connection.

If, at operation 640, the topology refinement component 204 determines that there are no additional connections in the routing path of the current net or if, at operation 615, the topology refinement component 204 determines the routing path does not violate a routing constraint, the topology refinement component 204 determines, at operation 650, whether there are additional nets in the routing topology. If, at operation 650, the topology refinement component 204 determines that there are additional nets in the routing topology, the topology refinement component 204 proceeds to process the additional net in accordance with the process set forth above. In this manner, the topology refinement component 204 iterates through and reroutes each connection of the routing path of each net in the routing topology that violates a routing constraint (e.g., by traversing a blockage or a congestion area).

If, at operation 650, the topology refinement component 204 determines that there are no additional nets in the routing topology, the process ends and the result is the refined routing topology 230, which, in some embodiments, may be a further refinement to the version of the refined routing topology generated as a result of the operation 410

Figure 7A:
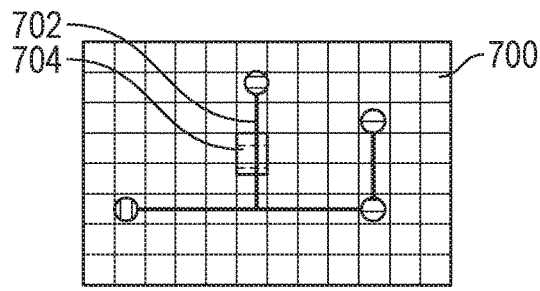
FIG. 7A-D are conceptual diagrams that graphically illustrate an operation of similar-topology routing, which may be performed as part of the method for routing based on an enhanced topology, according to some example embodiments.

FIG. 7A-D are conceptual diagrams that graphically illustrate the operation 410, where the topology refinement component 204 performs similar-topology routing of a net as part of the method 400, according to some example embodiments. An initial routing topology 700 is shown in FIG. 7A. The initial routing topology 700 includes a routing path that connects multiple pins along with a grid graph superimposed over the routing path. The grid graph includes a plurality of grid cells. As shown, a connection 702 in the routing path traverses a routing blockage 704.

Figure 7B:
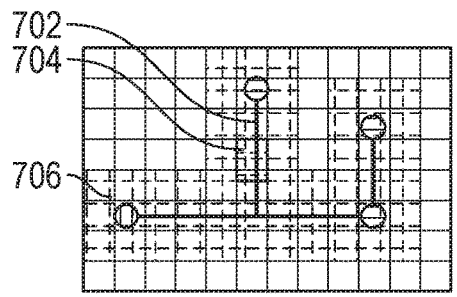

As shown in FIG. 7B, in response to determining that the connection 702 in the routing path traverses the routing blockage 704 (e.g., at operation 510), the topology refinement component 204 creates a routing guide 706 by marking grid cells in the grid graph that are within a predefined threshold distance of the routing path (e.g., at operation 515).

Figure 7C:
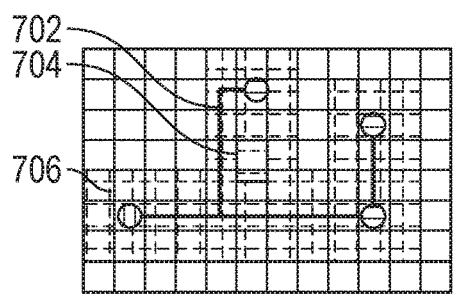

As shown in FIG. 7C, the topology refinement component 204 reroutes the routing path within the routing guide 706 such that the routing blockage 704 is avoided (e.g., at operation 520). More specifically, the topology refinement component 204 modifies the connection 702 to no longer traverse the routing blockage 704 by rerouting the connection 702 within the routing guide 706 (e.g., the marked cells).

Figure 7D:
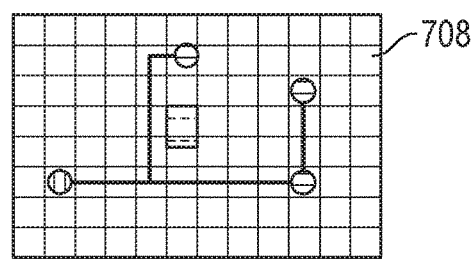

As shown in FIG. 7D, the topology refinement component 204 unmarks the grid cells of the routing guides (e.g., at operation 525). The result is a refined routing topology 708. The refined routing topology 708 may be stored permanently or temporarily in a computer storage device, displayed within the GUI 101, output to the detailed router 202, and/or further refined in accordance with the methodologies set forth in the description of operation 415 set forth above.

Figure 8A:
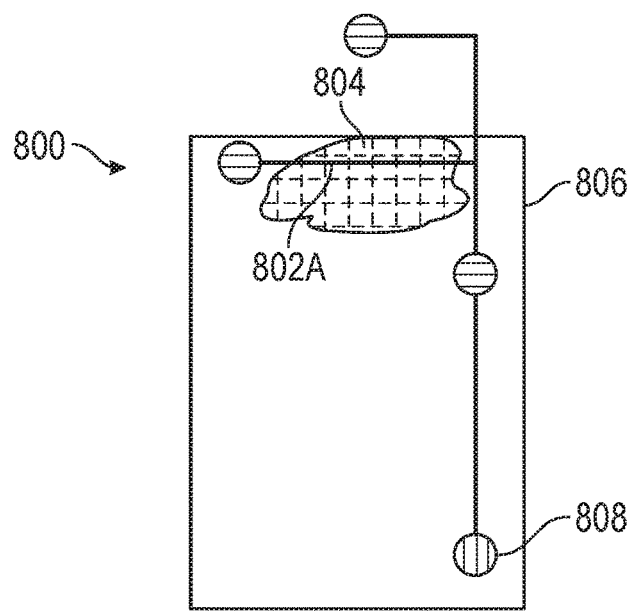
FIGS. 8A and 8B are conceptual diagrams that graphically illustrate an operation of net rerouting within a source-to-sink-aware bounding box, which may be performed as part of the method for routing based on an enhanced topology, according to some example embodiments.
Figure 8B:
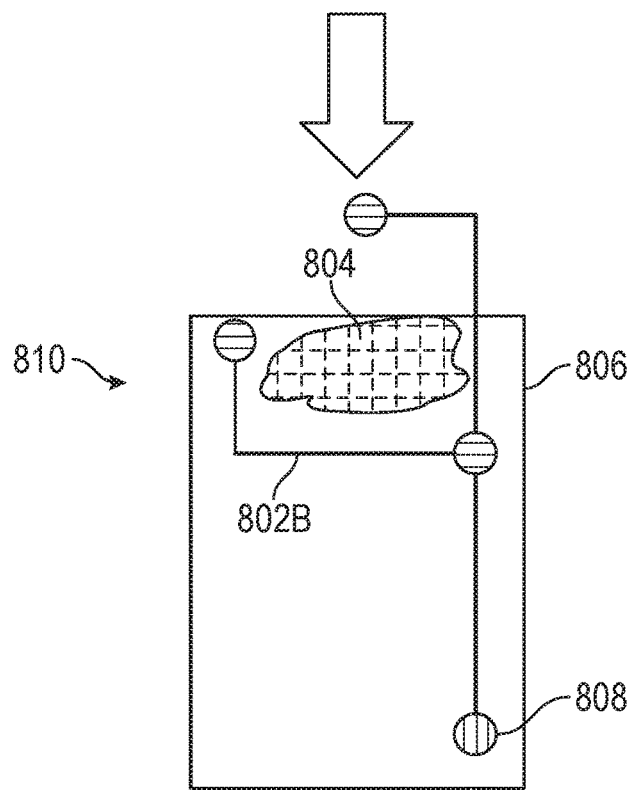

FIGS. 8A and 8B are conceptual diagrams that graphically illustrate the operation 415, where the topology refinement component 204 reroutes a net within a source-to-sink-aware bounding box as part of the method 400, according to some example embodiments. A routing topology 800, shown in FIG. 8A, includes a routing path that interconnects multiple pins. The routing path includes a connection 802a that traverses a congestion area 804. To remedy the issue with the connection 802a traversing the congestion area 804, the topology refinement component 204 creates a minimum bounding box 806 that encloses the connection 802a and a pin 808, which is the source for the net.

As shown in FIG. 8B, the topology refinement component 204 has rerouted the connection 802a within the minimum bounding box 806 such that the congestion area 804 is avoided. More specifically, the topology refinement component 204 has replaced the connection 802a with a connection 802b that avoids the congestion area 804. The result is a refined routing topology 810. The refined routing topology 810 may be stored permanently or temporarily in a computer storage device, displayed within the GUI 101, and/or output to the detailed router 202.

Figure 9:
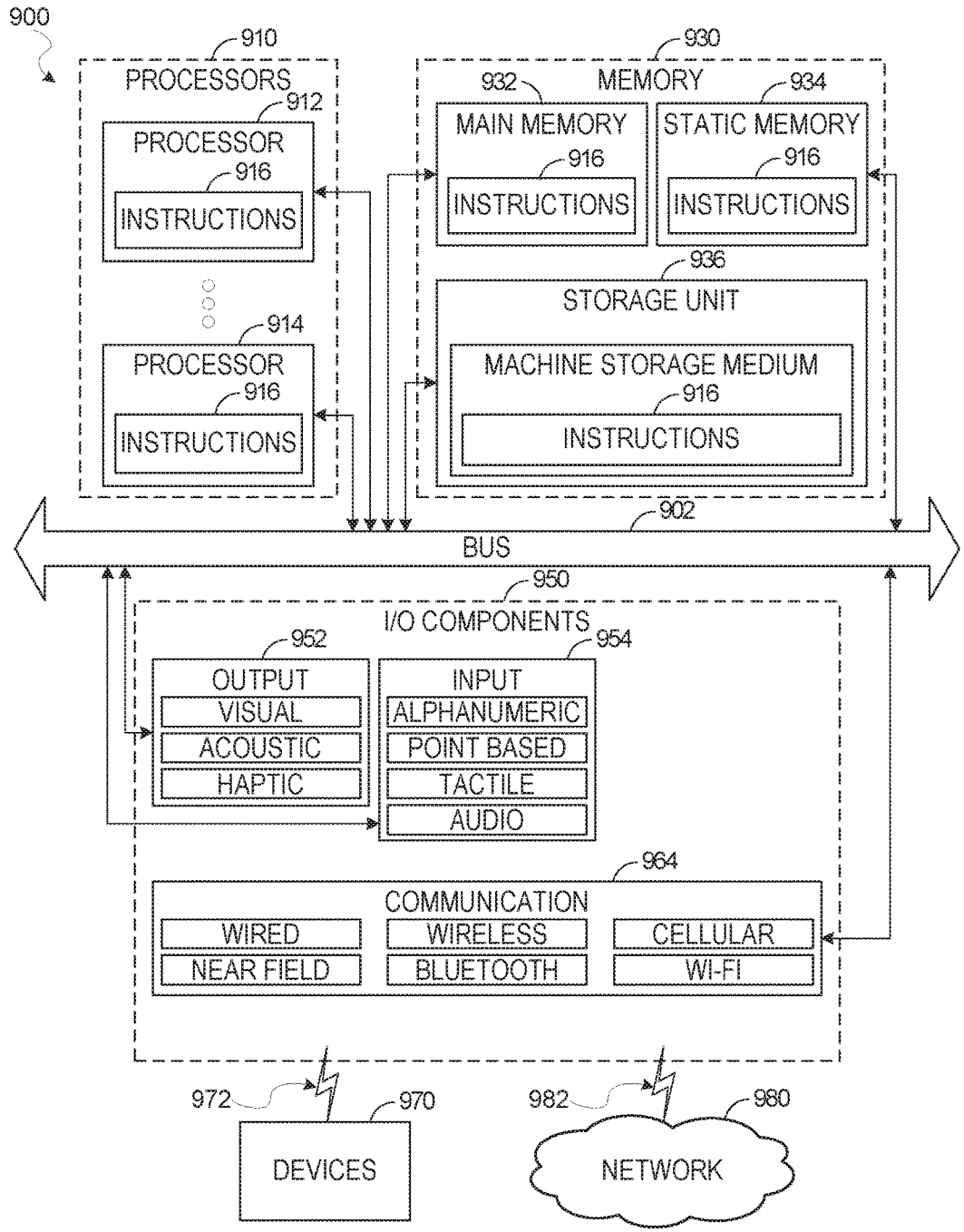
FIG. 9 is a diagrammatic representation of a machine in the example form of a computer system within which a set of instructions for causing the machine to perform any one or more of the methodologies discussed herein may be stored and executed.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method 400. Additionally, or alternatively, the instructions 916 may implement FIGS. 1-3. The instructions 916 transform the general, non-programmed machine 900 into a particular machine 900, such as the routing engine 104, programmed to carry out the described and illustrated functions in the manner described here. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook) a smart phone, a mobile device, a), a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, both accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)).

Executable Instructions and Machine Storage Medium

The various memories (e.g., 930, 932, 934, and/or memory of the processor(s) 910) and/or the storage unit 936 may store one or more sets of instructions and data structures (e.g., software) embodying or utilized by any one or more of the methodologies or functions described herein. These instructions, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks: magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a computer storage medium storing instructions, which when executed by the machine, cause the machine to perform operations comprising:
      accessing a routing topology of an integrated circuit (IC) design, the routing topology including a plurality of nets and a grid structure superimposed over the plurality of nets, each net of the plurality of nets including a routing path that interconnects a plurality of pins, the grid structure including a plurality of perpendicular lines that form a plurality of grid cells;
      determining that a first routing path of a first net in the routing topology violates a routing constraint;
      in response to determining that the first routing path violates the routing constraint, creating a routing guide for rerouting the first routing path, the routing guide including a first set of grid cells, each grid cell in the first set of grid cells being within a predefined threshold distance of the first routing path, the creating of the routing guide comprises marking all grid cells in the grid structure that are within the predefined threshold distance of the first routing path; and
      rerouting the first routing path of the first net within the routing guide, the rerouting of the first routing path within the routing guide resulting in a refined routing topology.

2. The system of claim 1, wherein the rerouting of the first routing path within the routing guide comprises applying a graph-search algorithm with a constraint that limits searching to the marked grid cells.

3. The system of claim 1, wherein the operations further comprise unmarking the grid cells.

4. The system of claim 3, wherein the operations further comprise:
   determining that a second routing path in the routing topology violates the routing constraint;
   in response to determining that the second routing path violates the routing constraint, marking a second set of grid cells in the grid structure that are within the predefined threshold distance of the second routing path; and
   rerouting the second routing path within the second set of grid cells.

5. The system of claim 1, wherein the determining that the first routing path of the first net in the routing topology violates the routing constraint comprises at least one of:
   determining that the first routing path traverses a routing blockage; or
   determining that the first routing path traverses routing congestion.

6. The system of claim 1, wherein the predefined threshold distance is specified by a user via a graphical user interface.

7. The system of claim 1, wherein the operations further comprise:
   determining that a second routing path of a second net in the refined routing topology violates a routing constraint, the second routing path including a plurality of connections, each of the connections connecting two pins in the second net, the second net including a source pin;
   determining that a first connection of the second routing path violates the routing constraint;
   creating a minimum bounding box that encloses the first connection and the source pin; and
   rerouting the first connection within the minimum bounding box.

8. The system of claim 7, wherein the rerouting of the first connection within the minimum bounding box comprises applying a graph-search algorithm with a constraint that limits searching to the minimum bounding box.

9. The system of claim 7, wherein the operations further comprise:
   determining that a second connection in the second routing path violates the routing constraint;
   creating an additional minimum bounding box that encloses the second connection and the source pin; and
   rerouting the second connection within the additional minimum bounding box.

10. A method comprising:
   accessing a routing topology of an integrated circuit (IC) design, the routing topology including a plurality of nets and a grid structure superimposed over the plurality of nets, each net of the plurality of nets including a routing path that interconnects a plurality of pins, the grid structure including a plurality of perpendicular lines that form a plurality of grid cells;
   determining that a first routing path of a first net in the routing topology violates a routing constraint;
   in response to determining that the first routing path violates the routing constraint, creating a routing guide for rerouting the first routing path, the routing guide including a first set of grid cells, each grid cell in the first set of grid cells being within a predefined threshold distance of the first routing path, the creating of the routing guide comprising marking all grid cells in the grid structure that are within the predefined threshold distance of the first routing path; and
   rerouting, using one or more processors of a machine, the first routing path of the first net within the first set of grid cells, the rerouting of the first routing path within the routing guide resulting in a refined routing topology.

11. The method of claim 10, wherein the rerouting of the first routing path within the routing guide comprises applying a graph-search algorithm with a constraint that limits searching to the first set of grid cells.

12. The method of claim 10, wherein the operations further comprise unmarking the grid cells.

13. The method of claim 12, wherein:
   the operations further comprise:
   determining that a second routing path in the routing topology violates a routing constraint;
   in response to determining that the second routing path violates the routing constraint, marking a second set of grid cells in the grid structure that are within the predefined threshold distance of the second routing path; and
   rerouting the second routing path within the second set of grid cells.

14. The method of claim 10, wherein the determining that the first routing path of the first net in the routing topology violates the routing constraint comprises at least one of:

determining that the first routing path traverses a routing blockage;
or
determining that the first routing path traverses a congestion area.

15. The method of claim 10, wherein the predefined threshold distance is specified by a user via graphical user interface.

16. The method of claim 10, further comprising:
determining that a second routing path of a second net in the refined routing topology violates a routing constraint, the second routing path including a plurality of connections, each of the connections connecting two pins in the second net, the second net including a source pin;
determining that a first connection of the second routing path violates the routing constraint;
creating a minimum bounding box that encloses the first connection and the source pin; and
rerouting the first connection within the minimum bounding box.

17. The method of claim 16, wherein the rerouting of the first connection within the minimum bounding box comprises applying a graph-search algorithm with a constraint that limits searching to the minimum bounding box.

18. The method of claim 16, further comprising:
determining that a second connection in the second routing path violates the routing constraint;
creating an additional minimum bounding box that encloses the second connection and the source pin; and
rerouting the second connection within the additional minimum bounding box.

19. A system comprising:
one or more processors of a machine; and
a computer storage medium storing instructions, which when executed by the machine, cause the machine to perform operations comprising:
accessing a routing topology of an integrated circuit (IC) design, the routing topology including a plurality of nets and a grid structure superimposed over the plurality of nets, each net of the plurality of nets including a routing path that interconnects a plurality of pins, the grid structure including a plurality of perpendicular lines that form a plurality of grid cells;
determining that a routing path of a net in the routing topology traverses a routing blockage or congestion area;
in response to determining that the routing path crosses the routing blockage or congestion area, creating a routing guide for rerouting the first routing path, each grid cell in the first set of grid cells being within a predefined threshold distance of the first routing path, the creating of the routing guide comprising marking all grid cells in the grid structure that are within the predefined threshold distance of the first routing path; and
rerouting the routing path of the net using a search algorithm that limits searching to the marked set of grid cells, the rerouting of the routing path within the marked set of grid cells resulting in a refined routing topology.

* * * * *